(12) United States Patent
Davis et al.

(10) Patent No.: US 12,234,017 B2
(45) Date of Patent: Feb. 25, 2025

(54) REDUNDANT RAIL AND CARRIAGE ASSEMBLY

(71) Applicant: B/E Aerospace, Inc., Winston-Salem, NC (US)

(72) Inventors: Lyle T. Davis, Pfafftown, NC (US); Bradley Steele, South Lyon, MI (US); Joseph Sikorski, Winston-Salem, NC (US); Twinkle V. Jacob, Winston-Salem, NC (US); Michael R. G. Warwick, Pleasant Garden, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 774 days.

(21) Appl. No.: 17/353,474

(22) Filed: Jun. 21, 2021

(65) Prior Publication Data
US 2022/0402612 A1 Dec. 22, 2022

(51) Int. Cl.
*B64D 11/06* (2006.01)
*E05D 15/06* (2006.01)

(52) U.S. Cl.
CPC ...... *B64D 11/0606* (2014.12); *B64D 11/0602* (2014.12); *E05D 15/0652* (2013.01);
(Continued)

(58) Field of Classification Search
CPC ............ B64D 11/0602; B64D 11/0606; B64D 11/0023; B64C 1/1438; B64C 1/1469
See application file for complete search history.

(56) References Cited

U.S. PATENT DOCUMENTS

| | | | |
|---|---|---|---|
| 370,289 | A | 9/1887 | Strobel |
| 1,722,828 | A | 7/1929 | Shonnard |

(Continued)

FOREIGN PATENT DOCUMENTS

| | | |
|---|---|---|
| CN | 108895084 A | 11/2018 |
| DE | 102009011859 A1 | 11/2009 |

(Continued)

OTHER PUBLICATIONS

Extended European Search Report in European Application No. 22179725.1 dated Nov. 17, 2022, 10 pages.

(Continued)

*Primary Examiner* — Richard Green
(74) *Attorney, Agent, or Firm* — Suiter Swantz IP

(57) ABSTRACT

A redundant rail and carriage assembly is disclosed. The assembly may include a primary sub-assembly including a primary rail and a primary carriage. The assembly may include a secondary sub-assembly including a secondary rail and a secondary carriage, the secondary rail being different than the primary rail, the secondary carriage being different than the secondary carriage. The assembly may be configured to couple to an actuatable door configured to actuate between a stowed door position and a deployed door position via at least one intermediate door position using one of the primary sub-assembly or the secondary sub-assembly, the secondary sub-assembly being configured to actuate the actuatable door via the secondary rail and the secondary carriage if one of the primary rail or the primary carriage of the primary sub-assembly fails.

15 Claims, 11 Drawing Sheets

(52) U.S. Cl.
CPC ...... *E05D 15/0686* (2013.01); *E05Y 2201/64* (2013.01); *E05Y 2201/684* (2013.01); *E05Y 2900/502* (2013.01); *E05Y 2900/531* (2013.01)

(56) References Cited

U.S. PATENT DOCUMENTS

| | | | |
|---|---|---|---|
| 3,248,749 | A | 5/1966 | Williams |
| 3,374,823 | A | 3/1968 | Ford |
| 3,430,678 | A | 3/1969 | Barnes et al. |
| 3,579,710 | A | 5/1971 | Gartzke |
| 4,546,809 | A | 10/1985 | Hadfield |
| 4,943,110 | A | 7/1990 | Pastva |
| 4,948,208 | A | 8/1990 | Schubert |
| 5,111,867 | A | 5/1992 | Horton et al. |
| 5,579,608 | A | 12/1996 | Dunn |
| 9,920,559 | B2 | 3/2018 | Druckman et al. |
| 10,717,513 | B2 * | 7/2020 | Vayssiere ............... B64C 1/1438 |
| 10,806,288 | B2 | 10/2020 | Schöpfer et al. |
| 11,708,162 | B2 * | 7/2023 | Ivanov ............... B64D 11/0606 244/118.6 |
| 2001/0003854 | A1 | 6/2001 | Lee |
| 2006/0023979 | A1 | 2/2006 | Liedmann et al. |
| 2011/0169288 | A1 | 7/2011 | Schreurs et al. |
| 2015/0074961 | A1 | 3/2015 | Glaze et al. |
| 2017/0106980 | A1 | 4/2017 | Kuyper et al. |
| 2017/0231413 | A1 | 8/2017 | Schöpfer et al. |
| 2018/0066706 | A1 | 3/2018 | Yen et al. |
| 2021/0179254 | A1 * | 6/2021 | Scotford ............... B64C 1/1438 |
| 2022/0402609 | A1 | 12/2022 | Warwick et al. |
| 2023/0012146 | A1 | 1/2023 | Sprague |

FOREIGN PATENT DOCUMENTS

| | | | |
|---|---|---|---|
| DE | 102020104480 A1 | 4/2021 | |
| GB | 2208085 A | 2/1989 | |
| NZ | 583042 A | 3/2013 | |
| RU | 2019128024 A3 | 3/2021 | |
| WO | 2017066559 A1 | 4/2017 | |
| WO | 2018093825 A1 | 5/2018 | |
| WO | 2019216927 A1 | 11/2019 | |
| WO | WO-2021069886 A1 * | 4/2021 | ......... B64D 11/0606 |

OTHER PUBLICATIONS

Extended Search Report in European Application No. 22180124.4 dated Oct. 19, 2022, 11 pages.

European Office Action dated Apr. 16, 2024; European Application No. 22180124.4.

* cited by examiner

REDUNDANT RAIL AND CARRIAGE ASSEMBLY

BACKGROUND

Aircraft cabin designs may include passenger suites. A particular passenger suite may include a door to separate the passenger suite from other areas in the aircraft cabin (e.g., an aisle, an adjacent passenger suite, or the like).

SUMMARY

An actuatable door for an aircraft passenger suite installed within an aircraft cabin is disclosed, in accordance with one or more embodiments of the disclosure. In one embodiment, the door includes one or more redundant rail and carriage assemblies, the one or more redundant rail and carriage assemblies coupled to a portion of the actuatable door. In another embodiment, each redundant rail and carriage assembly includes a primary rail and carriage sub-assembly, the primary rail and carriage sub-assembly including a primary rail and a primary carriage. In another embodiment, each redundant rail and carriage assembly includes a secondary rail and carriage sub-assembly, the secondary rail and carriage sub-assembly including a secondary rail and a secondary carriage, the secondary rail being different than the primary rail, the secondary carriage being different than the secondary carriage. In another embodiment, the actuatable door is coupled to a suite wall of the aircraft passenger suite, the suite wall including an opening configured to allow for access to the passenger suite from an open area within the aircraft cabin. In another embodiment, the actuatable door is configured to actuate between a stowed door position and a deployed door position via at least one intermediate door position using one of the primary rail and carriage sub-assembly or the secondary rail and carriage sub-assembly, the secondary rail and carriage sub-assembly being configured to actuate the actuatable door via the secondary rail and the secondary carriage if one of the primary rail or the primary carriage of the primary rail and carriage sub-assembly fails. In another embodiment, the actuatable door is configured to separate the passenger suite from the open area within the aircraft cabin when in the deployed door position and provide privacy to the aircraft passenger suite.

In some embodiments, a first secondary rail of a first secondary rail and carriage sub-assembly may be coupled to a top portion of the actuatable door and an additional secondary rail of an additional secondary rail and carriage sub-assembly may be coupled to a bottom portion of the actuatable door.

In some embodiments, a first primary rail of a first primary rail and carriage sub-assembly may be coupled to a top portion of a suite wall of the aircraft passenger suite and an additional primary rail of an additional primary rail and carriage sub-assembly may be coupled to a bottom portion of the suite wall of the aircraft passenger suite.

In some embodiments, a first secondary carriage of a first secondary rail and carriage sub-assembly may be coupled to a top portion of the actuatable door and an additional secondary carriage of an additional secondary rail and carriage sub-assembly may be coupled to a bottom portion of the actuatable door.

In some embodiments, a first primary carriage of a first primary rail and carriage sub-assembly may be coupled to a top portion of a suite wall of the aircraft passenger suite and an additional primary carriage of an additional primary rail and carriage sub-assembly may be coupled to a bottom portion of the suite wall of the aircraft passenger suite.

In some embodiments, each redundant rail and carriage assembly may further includes a coupling bridge configured to couple the primary carriage to the secondary carriage, the coupling bridge configured to align the primary carriage and the secondary carriage.

In some embodiments, the travel of the primary carriage on the primary rail may be equal to the travel of the secondary carriage on the secondary rail.

An aircraft passenger suite is disclosed, in accordance with one or more embodiments of the disclosure. In one embodiment, the passenger suite includes a suite wall installed within an aircraft cabin, the suite wall including an opening configured to allow for access to the passenger suite from an open area within the aircraft cabin. In another embodiment, the passenger suite includes one or more actuatable doors, the one or more actuatable doors being configured to separate the passenger suite from the open area within the aircraft cabin when in the deployed door position and provide privacy to the aircraft passenger suite. In another embodiment each actuatable door includes one or more redundant rail and carriage assemblies. In another embodiment, the one or more redundant rail and carriage assemblies are coupled to a portion of the actuatable door. In another embodiment, each redundant rail and carriage assembly includes a primary rail and carriage sub-assembly, the primary rail and carriage sub-assembly including a primary rail and a primary carriage. In another embodiment, each redundant rail and carriage assembly includes a secondary rail and carriage sub-assembly, the secondary rail and carriage sub-assembly including a secondary rail and a secondary carriage, the secondary rail being different than the primary rail, the secondary carriage being different than the secondary carriage. In another embodiment, the one or more actuatable doors are configured to actuate between a stowed door position and a deployed door position via at least one intermediate door position, using one of the primary rail and carriage sub-assembly or the secondary rail and carriage sub-assembly, the secondary rail and carriage sub-assembly are configured to actuate the actuatable door via the secondary rail and the secondary carriage if one of the primary rail or the primary carriage of the primary rail and carriage sub-assembly fails.

In some embodiments, a first secondary rail of a first secondary rail and carriage sub-assembly may be coupled to a top portion of the one or more actuatable doors and an additional secondary rail of an additional secondary rail and carriage sub-assembly may be coupled to a bottom portion of the one or more actuatable doors.

In some embodiments, a first primary rail of a first primary rail and carriage sub-assembly may be coupled to a top portion of a suite wall of the aircraft passenger suite and an additional primary rail of an additional primary rail and carriage sub-assembly may be coupled to a bottom portion of the suite wall of the aircraft passenger suite.

In some embodiments, a first secondary carriage of a first secondary rail and carriage sub-assembly may be coupled to a top portion of the one or more actuatable doors and an additional secondary carriage of an additional secondary rail and carriage sub-assembly may be coupled to a bottom portion of the one or more actuatable doors.

In some embodiments, a first primary carriage of a first primary rail and carriage sub-assembly may be coupled to a top portion of a suite wall of the aircraft passenger suite and an additional primary carriage of an additional primary rail and carriage sub-assembly may be coupled to a bottom portion of the suite wall of the aircraft passenger suite.

In some embodiments, at least a portion of the passenger suite may be defined by a bridge installed within the aircraft cabin.

In some embodiments, the passenger suite may further include an aircraft seat.

In some embodiments, each redundant rail and carriage assembly may further includes a coupling bridge configured to couple the primary carriage to the secondary carriage, the coupling bridge configured to align the primary carriage and the secondary carriage, the travel of the primary carriage on the primary rail is equal to the travel of the secondary carriage on the secondary rail.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
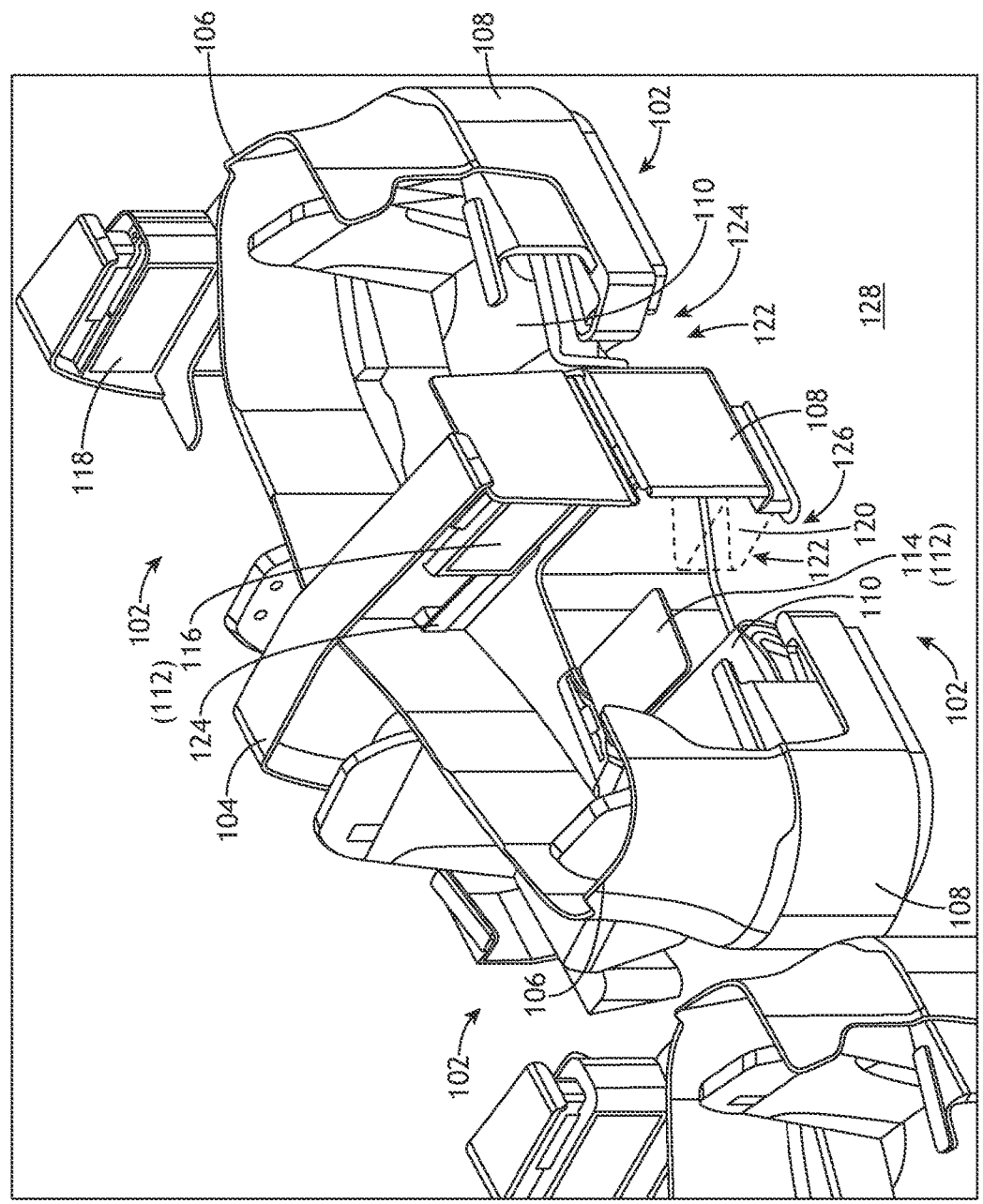
FIG. 1A illustrates an aircraft cabin with a passenger suite including an actuatable door, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-5 in general illustrate a redundant rail and carriage assembly, in accordance with one or more embodiments of the disclosure.

Aircraft cabin designs may include passenger suites. A particular passenger suite may include a door to separate the passenger suite from other areas in the aircraft cabin (e.g., an aisle, an adjacent passenger suite, or the like). The separation of the passenger suite from other areas in the aircraft cabin may provide privacy to an occupant within the passenger suite when the door is closed. When the door is open, an opening within the passenger suite may be configured to allow for access to the passenger suite from an open area within the aircraft cabin (or egress from the passenger suite into the open area within the aircraft cabin). When the door is closed, the opening may temporarily prevent egress from the passenger suite into the open area within the aircraft cabin (e.g., preventing egress only to the extent such prevention does not inconvenience an occupant or generate an unsafe environment in the event of an emergency).

Aircraft cabin designs need to be certified in accordance with aviation guidelines and standards, while being designed so as not to lose the intended functionality of the structures and/or monuments in the aircraft cabin. For example, the structures and/or monuments in the aircraft cabin may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

During select stages of flight (e.g., taxi, takeoff, and landing), the door must be in an open position to allow a passenger to egress from the passenger suite in the event of an emergency, as required by aviation guidelines and standards. Additionally, the door must include an emergency egress method or system for the passenger to exit their seat in the event that the first means of egress (e.g., the door) is jammed in the deployed position. In select designs, the door may include a breakaway latch to separate the door from its rails or an emergency hinge that may rotate the panel to open the door into the aisle. Compliance with these rules is typically shown using a combination of analysis and naïve subject testing. It is noted that naïve testing may include, for purposes of the present disclosure, running simulated scenarios where the main door deployment mechanism has failed and a secondary emergency path is utilized. However, naïve subject testing is expensive and time consuming.

In conventional door systems a single rail door mechanism is used to deploy the door. In such designs, a failure of the primary mechanical system blocks emergency egress from a passenger suite, which thus requires utilizing complex backup mechanisms that allow the passenger to escape. However, these escape mechanisms require the passenger to assess their situation, follow placarded instructions, and then use the escape mechanism (e.g., a pull lever that disengages the door from the deployment mechanism).

As such, it would be desirable to provide a redundant rail and carriage assembly for an actuatable door for an aircraft passenger suite. The redundant rail and carriage assembly should cause the door to operate normally without the passenger being aware of a primary mechanical system failure, so as to reduce the need for special pre-flight instruction or demonstrations. The redundant rail and carriage assembly should reduce the need for naïve subject testing, so as to streamline the certification process with respect to aviation guidelines and standards.

Figure 1B:
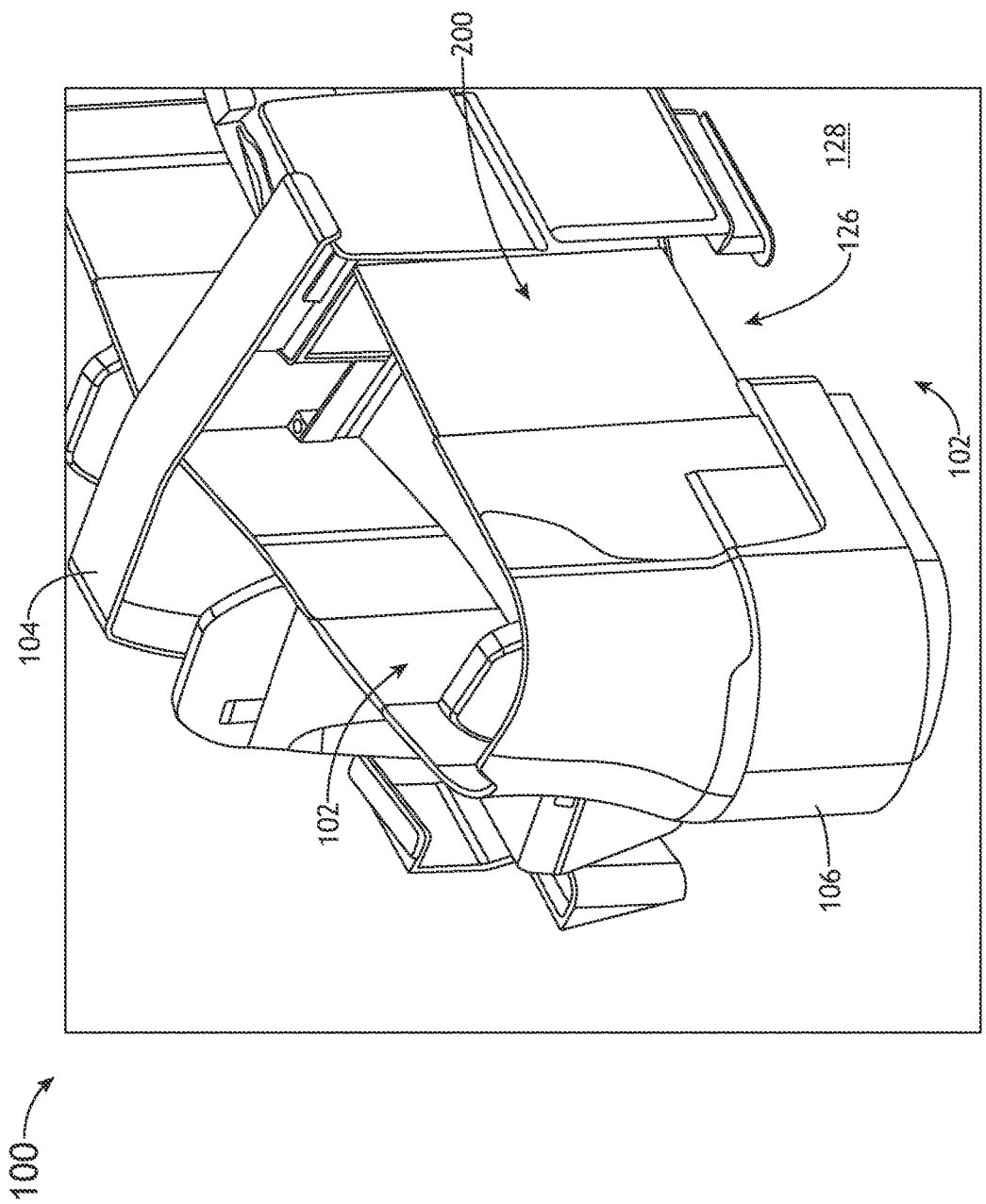
FIG. 1B illustrates an aircraft cabin with a passenger suite including an actuatable door, in accordance with one or more embodiments of the disclosure.
Figure 1C:
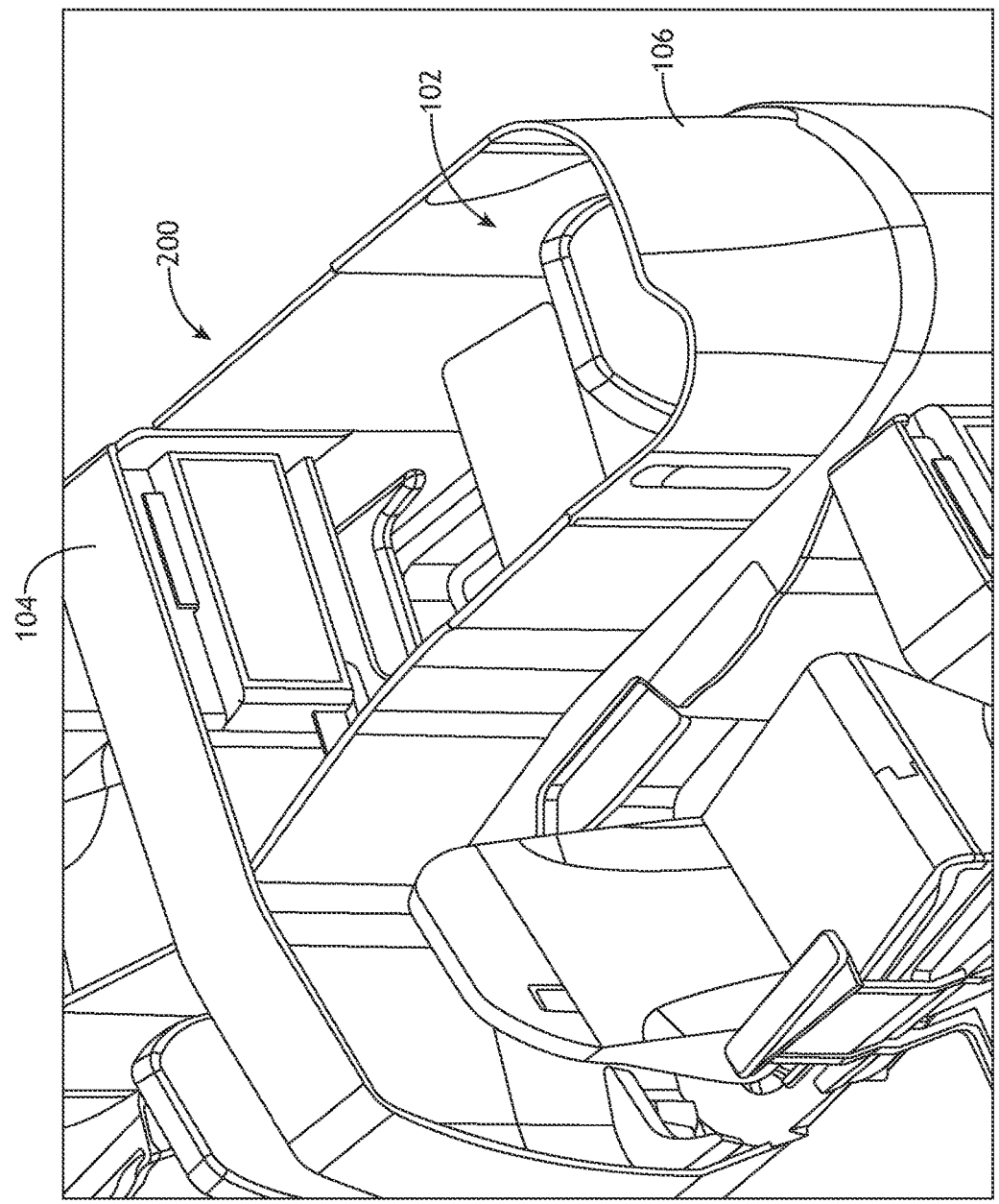
FIG. 1C illustrates an aircraft cabin with a passenger suite including an actuatable door, in accordance with one or more embodiments of the disclosure.

FIGS. 1A-1C illustrate an aircraft cabin 100 and one or more passenger suites 102, in accordance with one or more embodiments of the disclosure.

Where there are multiple passenger suites 102, the multiple passenger suites 102 may be separated by a bridge 104. The bridge 104 may define at least a portion of each of the multiple passenger suites 102. It is noted adjacent passenger suites 102 may be considered as on particular sides of the bridge 104. Where there are multiple passenger suites 102, the multiple passenger suites 102 may be arranged in an inboard/outboard configuration and/or a forward/rearward configuration. It is noted, however, the multiple passenger suites 102 may be arranged in any configuration within the aircraft cabin 100.

The passenger suite 102 may include a suite wall 106 with one or more suite wall elements 108. For example, at least some of the one or more suite wall elements 108 may be a component of a particular suite wall 106 corresponding to a particular passenger suite 102. By way of another example, at least some of the one or more suite wall elements 108 (e.g., to the entirety of a suite wall 106 structure) may be shared between adjacent passenger suites 102.

The bridge 104 and/or the suite wall 106 may be implemented as a divider or structure separating adjacent passenger suites 102 and/or separating a passenger suite 102 from an area within the aircraft cabin 100. For example, where the bridge 104 is implemented as a separator, the bridge 104 may be configured to allow for the multiple passenger suites 102 to be installed within the aircraft cabin 100 in a more compact arrangement. In this regard, the amount of floor area of the aircraft cabin 100 necessary for the one or more aircraft seats 110 may be reduced.

It is noted portions of the suite wall 106 have been cut away or removed for purposes of clarity within FIGS. 1A-1C.

The one or more passenger suites 102 may include one or more aircraft seats 110 (e.g., business class or first-class passenger seats). It is noted the terms "aircraft seats" and "passenger seats" may be considered equivalent, for purposes of the disclosure.

The one or more aircraft seats 110 may include, but are not limited to, seat pans, seat cushions, legs, support members, actuatable armrests, seatbelts, or the like. The one or more aircraft seats 110 may be attachable to embedded seat tracks located in a floor of the aircraft cabin 100 via conventional track fasteners and/or be couplable to the suite wall 106 (e.g., where the suite wall 106 may be attachable to embedded seat tracks located in the floor of the aircraft cabin 100 via conventional track fasteners).

An aircraft seat 110 may be rotatable about an axis (e.g., swivelable). The aircraft seat 110 may be fully positionable between the outer limits of motion as defined by the moveable components of the aircraft seat 110 and/or one or more auxiliary monuments 112 of the passenger suite 102. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 110 may be actuatable (e.g., translatable and/or rotatable) from the TTL position to a non-TTL position, and/or vice versa. Further, it is noted the aircraft seat 110 may be capable of a fully upright or raised position, and that the TTL position may have a more reclined seat back cushion and a more angled upward seat pan cushion as compared to the fully upright or raised position. Therefore, the above description should not be interpreted as a limitation on the present disclosure but merely an illustration.

In general, the aircraft seat 110 may be translatable (e.g., trackable or slidable). The aircraft seat 110 may be rotatable about an axis cross-wise through the aircraft seat 110 into a position including, but not limited to, an upright or raised position, one or more lounge or reclined positions, and a lie-flat or bed position. For example, the aircraft seat 110 may transition directly between the upright or raised position and the lie-flat or bed position. By way of another example, it is noted the aircraft seat 110 may transition through one or more lounge or reclined positions between the upright or raised position and the lie-flat or bed position. By way of another example, the aircraft seat 110 may transition into one or more lounge reclined positions in a motion separate from the transition between the upright or raised position and the lie-flat or bed position. Therefore, the above description should not be interpreted as a limitation on the scope of the disclosure but merely an illustration.

The aircraft seat 110 may be configured to avoid contact with the one or more auxiliary monuments 112 when transitioning between positions (e.g., between the upright or raised position and the lie-flat or bed position). It is noted that at least some components (e.g., at least a portion of the bridge 104, the suite wall 106 with suite wall elements 108, the one or more auxiliary monuments 112, or the like) may conform to a portion of an aircraft seat 110. In this regard, the amount of floor area of the aircraft cabin 100 necessary for the one or more aircraft seats 110 may be reduced.

The one or more auxiliary monuments 112 may include, but are not limited to, a structure 114 with a horizontal (or substantially horizontal) surface such as a tray or table, a side stand, or the like. The structure 114 may include a top surface, a bottom surface, and/or one or more side surfaces. For example, a structure 114 may include a single continuous side surface where all corners are rounded. By way of another example, the structure 114 may include up to an N number of side surfaces where the auxiliary monument includes up to an N number of corners. The structure 114 may be actuatable (e.g., may extend a select distance from a stored position to an extended position proximate to a passenger, similar to an aircraft tray table). It is noted, however, that the structure 114 may be fixed in position.

The one or more auxiliary monuments 112 may include, but are not limited to, a structure 116 with a vertical (or substantially vertical) surface such as an actuatable privacy panel of the bridge 104. The structure 116 may be untrimmed or may be covered with trim (e.g., interior or exterior décor panels) matching other trim in the passenger suite 102 (and/or the aircraft cabin 100).

The structure 116 may have an in-flight entertainment (IFE) device 118 attached to its vertical (or substantially vertical) surface. For example, where the structure 116 is actuatable, the IFE device 118 may be actuatable. It is noted the structure 116 may itself be an IFE device 118. In addition, it is noted the IFE device 118 may be coupled to other monuments (e.g., in an actuatable position or a fixed position) within the aircraft cabin 100.

The passenger suite 102 may include an ottoman 120 within a footwell 122. The ottoman 120 may be usable by a passenger in the aircraft seat 110 when the corresponding aircraft seat 110 is in the upright or raised position, the one or more reclined or lounge positions, and/or the lie-flat or bed position. For example, the ottoman 120 may form a portion of a bed surface when the corresponding aircraft seat 110 is in the lie-flat or bed position. The ottoman 120 may be usable by a passenger in an aircraft seat 110 positioned proximate to the passenger suite 102 when the corresponding aircraft seat 110 is in a reclined or lounge position.

The ottoman 120 may be configured to translate and/or rotate about an axis through a sidewall of the ottoman 120 to direct a top surface to a passenger occupying the aircraft seat 110. For example, where the ottoman 120 may be configured to both translate and rotate, the ottoman 120 may be configured to independently rotate and/or translate. By way of another example, where the ottoman 120 may be configured to both translate and rotate, a rotation may prevent further translation until the ottoman 120 is returned to a select position and/or a translation may prevent further rotation until the ottoman 120 is returned to a select position.

One or more dimensions of the footwell 122 may be changed by transitioning the aircraft seat 110 between the upright or raised position, the one or more lounge or reclined positions, and the lie-flat or bed position. It is noted that a portion of the ottoman 120 may be actuatable (e.g., along a set of tracks or linear rails) to a position outside of the footwell 122.

It is noted, however, the aircraft seat 110 and/or the ottoman 120 may be limited to an upright or raised position and/or one or more lounge or reclined positions. In addition, it is noted the aircraft seat 110 may be the sole component forming a bed when the aircraft seat 110 is in a lie-flat or bed position. Therefore, the above description should not be interpreted as a limitation on the present disclosure but merely an illustration.

The passenger suite 102 may include one or more storage compartments 124. The one or more storage compartments 124 may be positioned proximate to or integrated within the bridge 104 and/or the suite wall 106 of the passenger suite 102. The one or more storage compartments 124 may be coupled to and/or at least be partially inset in the one or more auxiliary monuments 112 (e.g., the structure 114, the structure 116, or the like), the ottoman 120, or the like.

At least some of the one or more storage compartments 124 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

At least some of the one or more storage compartments 124 may include one or more electronic connections for one or more passenger amenities such as, but not limited to, one or more charging ports, one or more charging cables, or the like.

At least some of the one or more storage compartments 124 may include one or more electronic connections in communication with one or more components of the passenger suite 102 such as, but not limited to, one or more display device connection ports, one or more display device connection cables, one or more audio output jacks (e.g., headphone jacks), one or more audio input jacks, or the like.

At least some of the one or more storage compartments 124 may include one or more safety devices (e.g., air masks, personal floatation devices, or the like).

At least some of the one or more storage compartments 124 may include a storage compartment (e.g., a wardrobe) configured to receive long and/or large items (e.g., passenger amenities needing to be hung, carry-on luggage, or the like) that require an increased space and/or that a passenger may prefer to store in a substantially vertical or upright orientation.

A cavity may be defined within the one or more storage compartments 124. One or more shelves may be installed within the cavity. At least some of the one or more storage compartments 124 may include a corresponding door. For example, a door may be fully-opaque or solid. By way of another example, a door may be at least partially fabricated from a transparent material (e.g., glass, plastic, or the like) or include a patterned or unpatterned set of cut-outs configured or designed to meet aviation guidelines and/or standards.

The passenger suite 102 may include one or more accessories. For example, the one or more lights and/or the one or more vents may be coupled to and/or partially inset in the one or more suite wall elements 108 of the suite wall 106, the bridge 104, or other locations within the passenger suite 102. By way of another example, the one or more accessories may include one or more electronics or electronic devices. For instance, the one or more accessories may include, but are not limited to, the one or more IFE devices 118, one or more speakers configured to provide media content separate from the media content shown on the one or more IFE devices 118 and/or accompanying the media content shown on the one or more IFE devices 118, one or more lights or lighted panels, one or more ventilation devices, one or more aircraft seat 110 actuation devices (e.g., assemblies, controls, actuators, and/or the like), one or more air flow or temperature control devices, one or more visual and/or auditory output control devices, or the like.

The suite wall 106 may include an opening 126 within the one or more suite wall elements 108 into the passenger suite 102. The opening 126 may allow for access to the passenger suite 102 from an aircraft aisle 128 within the aircraft cabin 100.

Figure 2A:
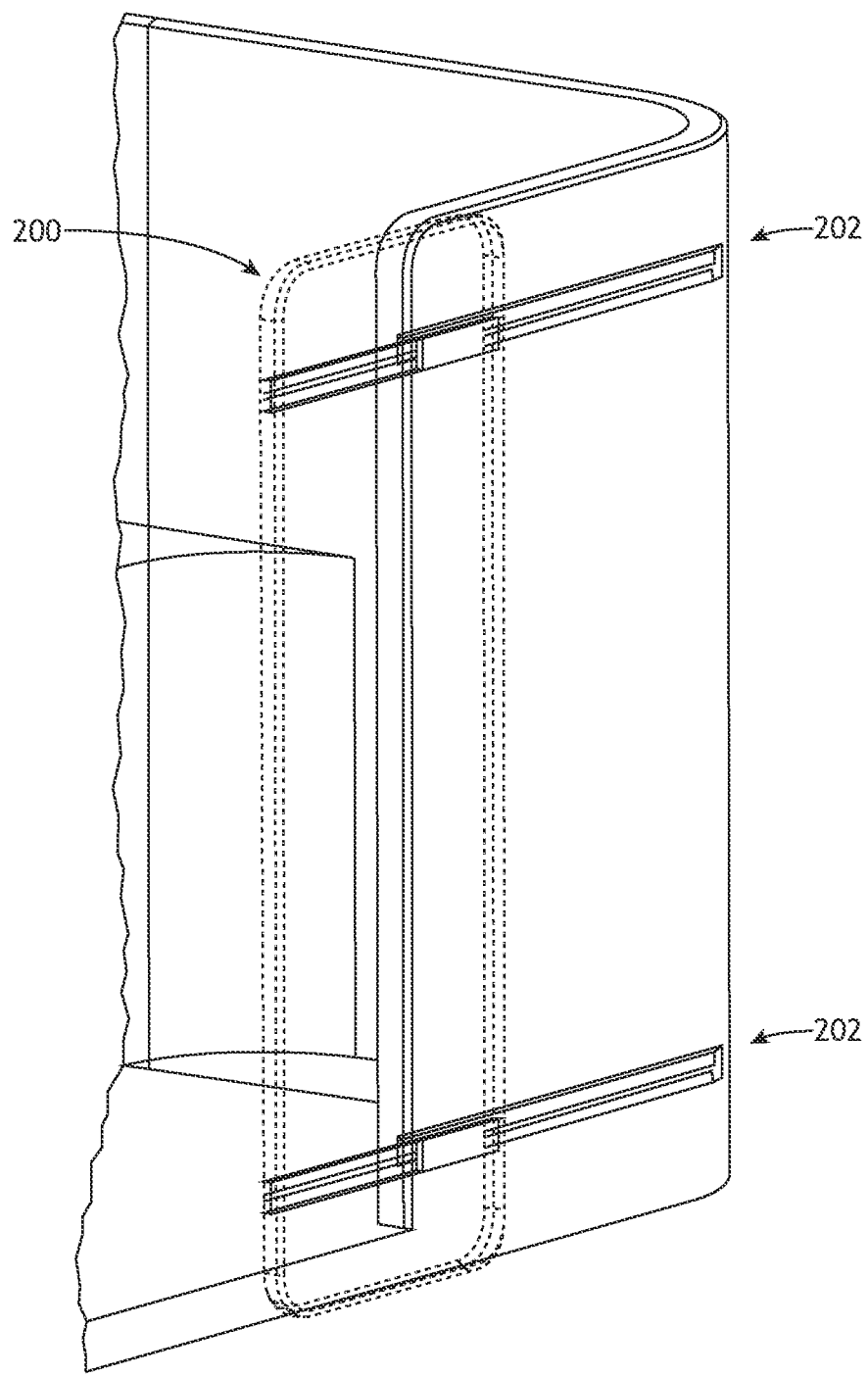
FIG. 2A illustrates a passenger suite including a redundant rail and carriage assembly, in accordance with one or more embodiments of the disclosure.
Figure 2B:
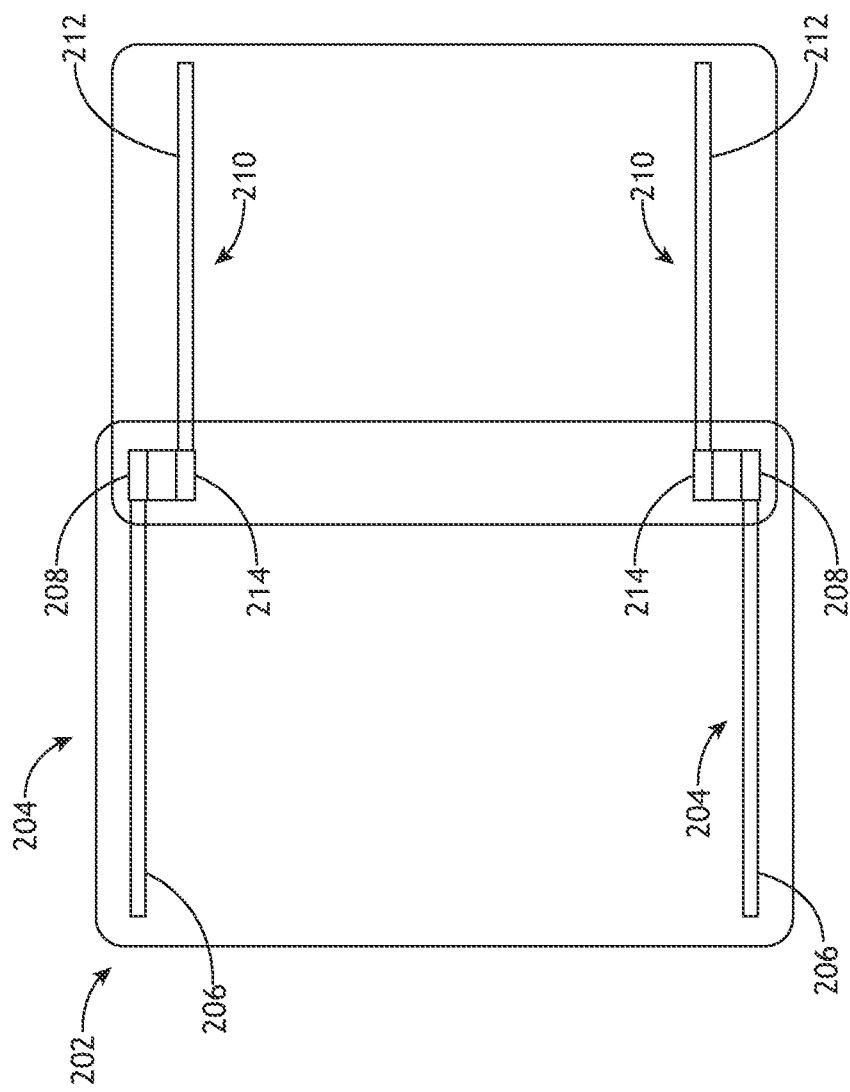
FIG. 2B illustrates a passenger suite including a redundant rail and carriage assembly, in accordance with one or more embodiments of the disclosure.
Figure 2C:
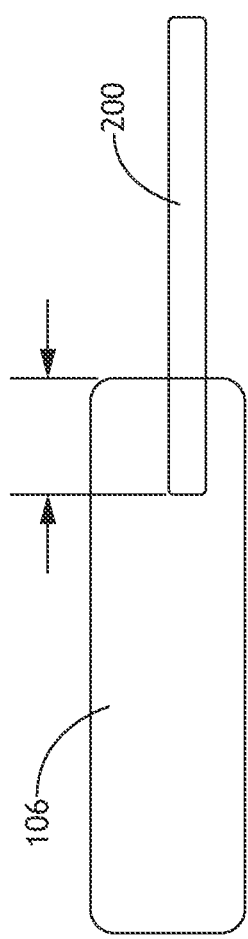
FIG. 2C illustrates a passenger suite including a redundant rail and carriage assembly, in accordance with one or more embodiments of the disclosure.
Figure 3:
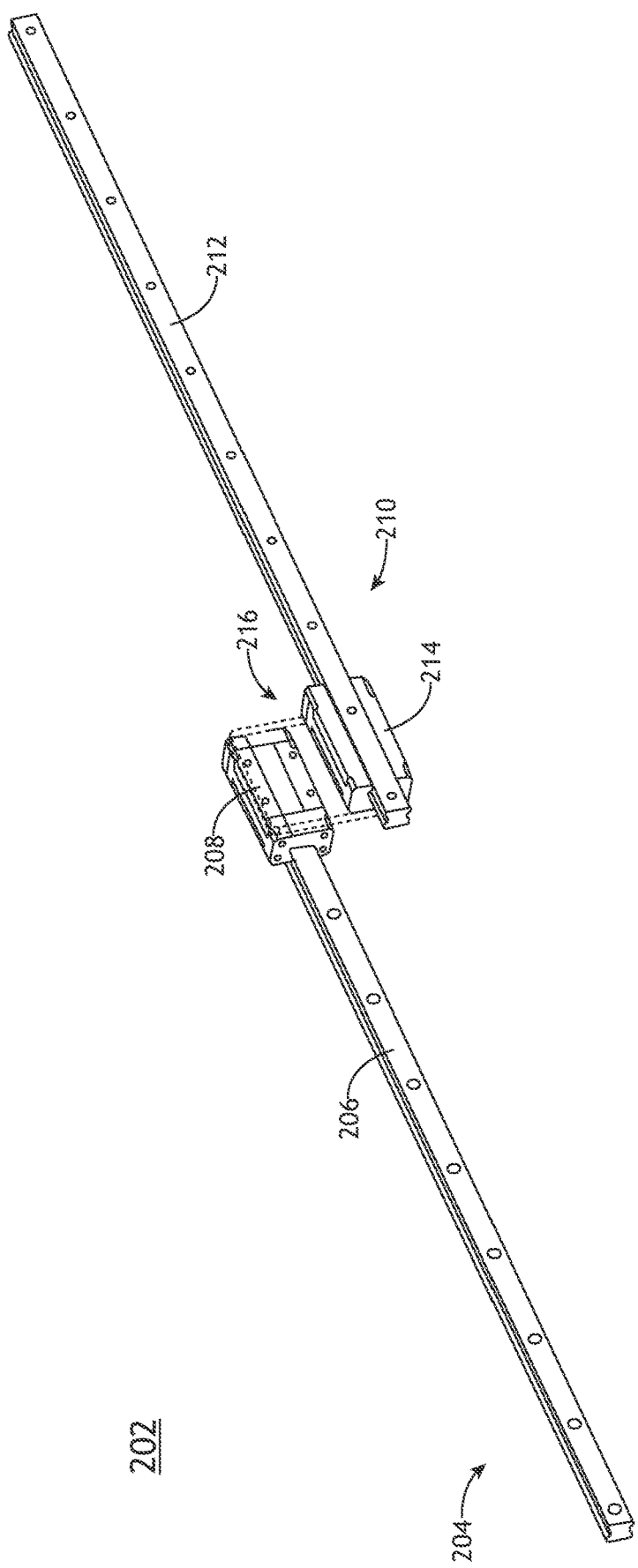
FIG. 3 illustrates a redundant rail and carriage assembly, in accordance with one or more embodiments of the disclosure.
Figure 4A:
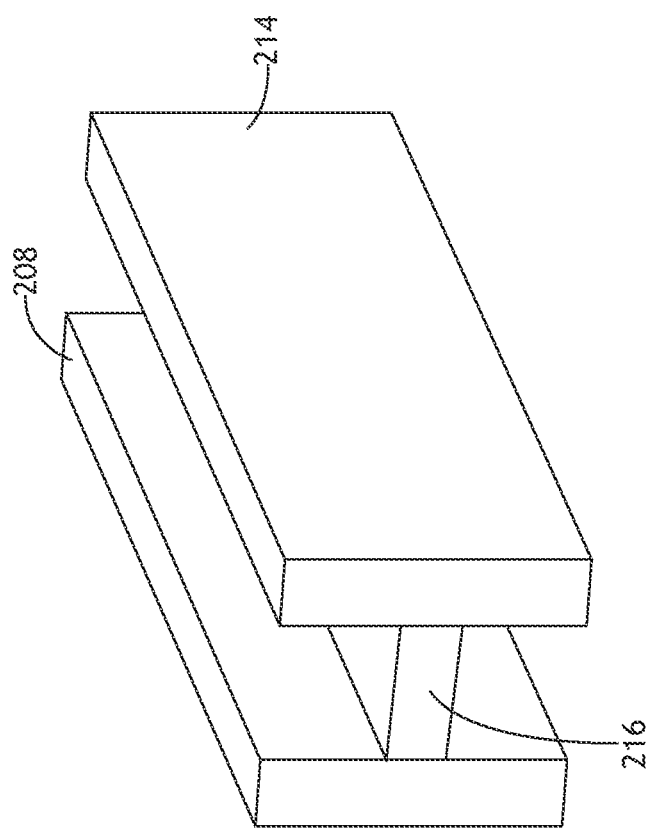
FIG. 4A illustrates a coupling bridge of the redundant rail and carriage assembly, in accordance with one or more embodiments of the disclosure.
Figure 4B:
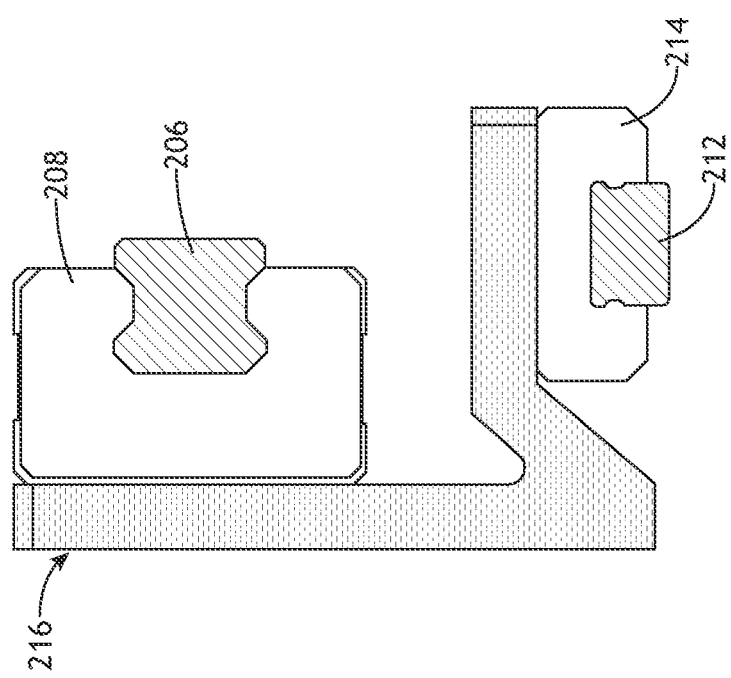
FIG. 4B illustrates a coupling bridge of the redundant rail and carriage assembly, in accordance with one or more embodiments of the disclosure.
Figure 4C:
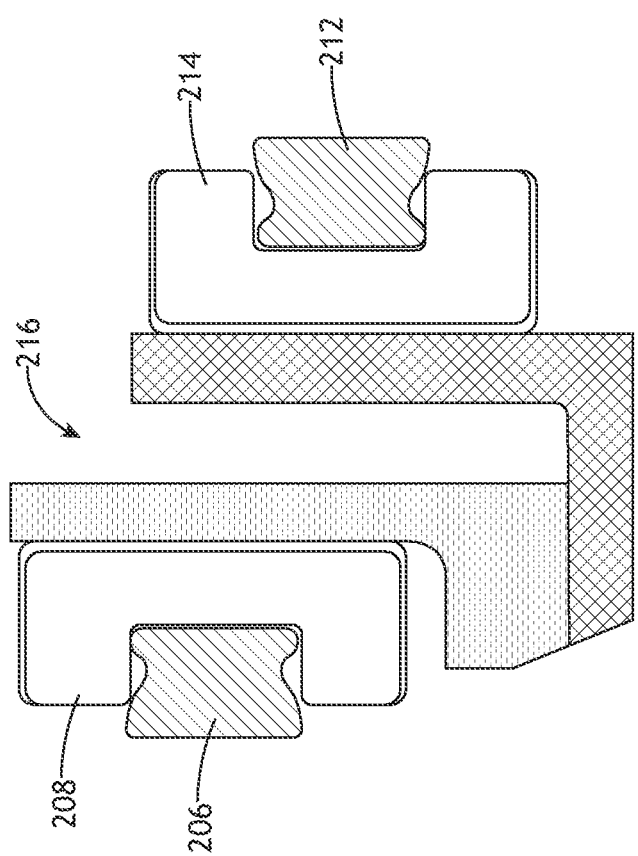
FIG. 4C illustrates a coupling bridge of the redundant rail and carriage assembly, in accordance with one or more embodiments of the disclosure.

FIGS. 2A-4C illustrate a redundant rail and carriage assembly 202, in accordance with one or more embodiments of the disclosure. In particular, FIGS. 2A-2C illustrate an actuatable door 200 include the redundant rail and carriage assembly 202. In particular, FIG. 3 illustrates an isolated view of the redundant rail and carriage assembly 202. In particular, FIGS. 4A-4C illustrate isolated views of a coupling bridge 216 of the redundant rail and carriage assembly 202.

The aircraft passenger compartment suite 102 may include one or more actuatable doors 200 for the opening 126. It is noted "actuatable door" and variants including, but not limited to, "actuatable screen", "door", and "screen" may be considered equivalent, for purposes of the disclosure.

The actuatable door 200 may be actuatable between a stowed position, a deployed position, and one or more intermediate positions via the redundant rail and carriage assembly 202. For example, the actuatable door 200 may be in the stowed door position during the TTL phases of flight. By way of another example, the actuatable door 200 may be in the deployed door position during non-TTL phases of flight. It is noted the actuatable door 200 may also be configured for one or more intermediate door positions. For example, the actuatable door 200 may be in a particular intermediate door position during transition between the stowed door position and the deployed door position.

The actuatable door 200 may separate the passenger suite 102 from other areas in the aircraft cabin 100 and may provide privacy to an occupant within the passenger suite 102 when the actuatable door 200 is in the deployed door position. When the actuatable door 200 is in the stowed door position (e.g., is open), the opening 126 within the passenger suite 102 may be configured to allow for access to the passenger suite 102 from an open area (e.g., the aircraft aisle 128, or other open area) within the aircraft cabin 100 (or egress from the passenger suite 102 into the open area within the aircraft cabin 100). When the door is in the stowed door position, the opening 126 may temporarily prevent egress from the passenger suite 102 into the open area within the aircraft cabin 100 (e.g., preventing egress only to the extent such prevention does not inconvenience an occupant or generate an unsafe environment in the event of an emergency).

During select stages of flight (e.g., taxi, takeoff, and landing), the door 200 must be in an open position to allow a passenger to egress from the passenger suite in the event of an emergency, as required by aviation guidelines and standards. The door 200 must include an emergency egress method or system for the passenger to exit their seat in the event that the first means of egress (e.g., the door) is jammed in the deployed position. In select designs, the door may include a breakaway latch to separate the door from its rails or an emergency hinge that may rotate the panel to open the door into the aisle. Compliance with these rules is typically shown using a combination of analysis and naïve subject testing. However, naïve subject testing is expensive and time consuming. Further, during the pre-flight stage of flight, the passengers are instructed on how to utilize such escape mechanisms. For example, the flight attendant may demonstrate how to use the emergency egress mechanism and a placard may be found near the door with instructions on how to operate the emergency egress mechanism. As such, there is a need for a door deployment mechanism that provides an emergency egress alternative, without the need for naïve subject testing and pre-flight instructions/demonstrations.

The one or more actuatable doors 200 may include one or more redundant rail and carriage assemblies 202.

Referring to FIG. 3, each redundant rail and carriage assembly 202 may include a primary rail and carriage sub-assembly 204. For example, each primary rail and carriage sub-assembly 204 may include a primary rail 206 and a primary carriage 208. It is noted "primary rail and carriage sub-assembly" and variants including, but not limited to, "primary sub-assembly", or "sub-assembly 204" may be considered equivalent, for purposes of the disclosure.

Each redundant rail and carriage assembly 202 may include a secondary rail and carriage sub-assembly 210. For example, each secondary rail and carriage sub-assembly 210 may include a secondary rail 212 and a secondary carriage 214. It is noted "secondary rail and carriage sub-assembly" and variants including, but not limited to, "secondary sub-assembly", or "sub-assembly 210" may be considered equivalent, for purposes of the disclosure.

It is noted that the one or more sub-assemblies 204, 210 may include any type of carriage known in the art. For example, the one or more sub-assemblies 204, 210 may include one or more slide bearing carriages. By way of another example, the one or more sub-assemblies 204, 210 may include one or more ball bearing carriages. Further, it is noted that the one or more sub-assemblies 204, 210 may include any type of rail known in the art. For example, the one or more sub-assemblies 204, 210 may include one or more linear motion rails.

It is noted that example embodiments of the carriage sub-assemblies 202, 210 may be found in United States Patent Publication No. 2022/0402609, published Dec. 22, 2022, which incorporated herein in the entirety.

Referring to FIGS. 2A-2B, one of the primary sub-assembly 204 or the secondary sub-assembly 210 may couple to one or more portions the actuatable door 200. For example, the secondary rail 212 of the sub-assembly 210 may couple to one or more portions of the door 200. For instance, as shown in FIGS. 2A-2B, a first rail 212 of a first sub-assembly 210 may couple to a top portion of the door 200 and an additional rail 212 of an additional sub-assembly 210 may couple to a bottom portion of the door 200. Continuing with this example, the primary rail 206 of the sub-assembly 204 may couple to one or more portions of the suite wall 106. For instance, as shown in FIGS. 2A-2B, a first rail 206 of a first sub-assembly 204 may couple to a top portion of the suite wall 106 and an additional rail 206 of an additional sub-assembly 204 may couple to a bottom portion of the suite wall 106. Continuing with this example, the secondary carriage 214 of the sub-assembly 210 may couple to a top portion of the actuatable door 200 and an additional carriage 214 of an additional sub-assembly 210 may couple to a bottom portion of the actuatable door 200. The primary carriage 208 of the sub-assembly 204 may couple to a top portion of the side wall 106 and an additional carriage 208 of an additional sub-assembly 204 may couple to a bottom portion of the side wall 106.

Although FIGS. 2A-2B depict the door 200 being coupled to the secondary sub-assembly 210 and the primary sub-assembly 204 being coupled to the suite wall 106, it is noted that the primary sub-assembly 204 may be configured to couple to a portion of the door 200 and the secondary sub-assembly 210 may be configured to couple to a portion of the suite wall 106. For example, the primary rail 206 of the sub-assembly 204 may couple to one or more portions of the door 200. For instance, a first rail 206 of a first sub-assembly 204 may couple to a top portion of the door 200 and an additional rail 206 of an additional sub-assembly 204 may couple to a bottom portion of the door 200. Continuing with this example, the secondary rail 212 of the sub-assembly 210 may couple to one or more portions of the suite wall 106. For instance, a first rail 212 of a first sub-assembly 210 may couple to a top portion of the suite wall 106 and an additional rail 212 of an additional sub-assembly 210 may couple to a bottom portion of the suite wall 106. Further, the secondary carriage 214 of the sub-assembly 210 may couple to a top portion of the side wall 106 and an additional carriage 214 of an additional sub-assembly 210 may couple to a bottom portion of the side wall 106. The primary carriage 208 of the sub-assembly 204 may couple to a top portion of the actuatable door 200 and an additional carriage 208 of an additional sub-assembly 204 may couple to a bottom portion of the actuatable door 200.

Referring to FIGS. 4A-4C, each redundant rail and carriage assembly 202 may include a carriage coupling bridge 216. For example, the carriage coupling bridge 216 may be configured to couple the primary rail and carriage sub-assembly 204 to the secondary rail and carriage sub-assembly 210. For instance, the coupling bridge 216 may be configured to align the primary carriage 208 and the secondary carriage 214. In this regard, the travel of the primary carriage 208 on the primary rail 206 is equal to the travel of the secondary carriage 214 on the secondary rail 212.

Although FIGS. 4A-4C depict a specific coupling bridge 216, it is noted that the coupling bridge may be any shape suitable for aligning the carriages of the sub-assemblies 204, 210 so that travel of each carriage on its own rail is equal to the redundant carriage travel on its rail. For example, as shown in FIG. 4B, the coupling bridge may have a curved shape to protrude from a covering shroud in order to block the view of the system.

Further, it is noted that the coupling bridge may be made of any substantial material known in the art suitable for withstanding the maximum loading for the moving device.

The door 200 may be actuatable via the one or more redundant rail and carriage assemblies 202. For example, when the primary sub-assembly 204 is operating properly, the door 200 may be actable via one or more primary sub-assemblies 204. For instance, the door 200 may be actuatable via the primary rail 206 and the primary carriage 208.

By way of another example, when the primary sub-assembly 204 is not operating properly, the door 200 may be actuatable via one or more secondary sub-assemblies 210. For instance, the door 200 may be actuatable via one of the secondary rail 212 or the secondary carriage 214. In this regard, when the primary deployment mechanism (e.g., the primary sub-assembly 204) fails, the secondary deployment mechanism (e.g., the secondary sub-assembly 210) may operate to deploy the door such that the passenger does not know that the primary mechanism has failed. This eliminates the need for a separate emergency egress mechanism and reduces the need for naïve subject testing.

Figure 5:
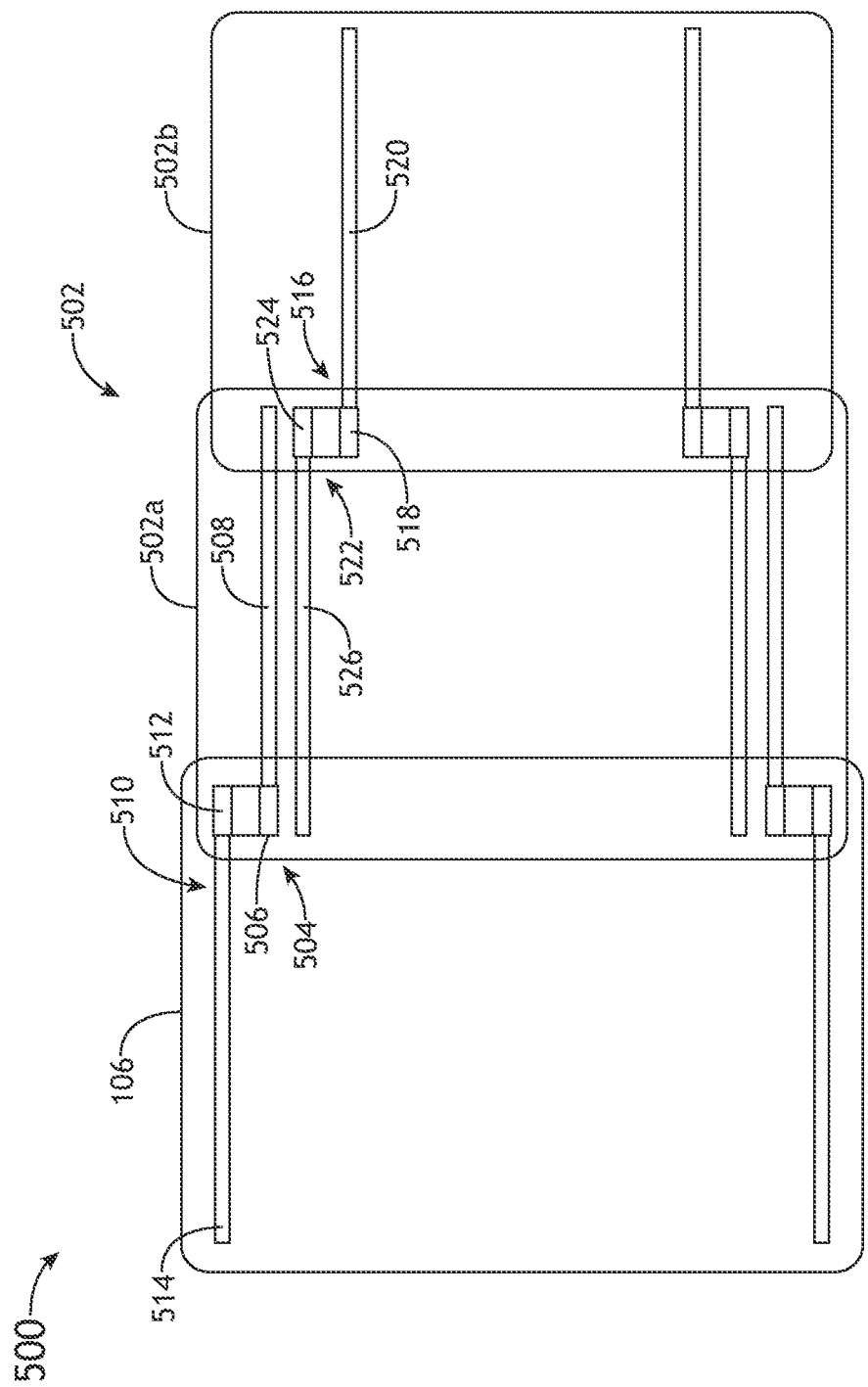
FIG. 5 illustrates a redundant rail and carriage assembly for a telescopic door, in accordance with one or more embodiments of the disclosure.

FIG. 5 illustrates a multi-level redundant rail and carriage assembly 500 for one or more actuatable doors, in accordance with one or more embodiments of the disclosure.

The aircraft passenger compartment suite 102 may include one or more actuatable doors. For example, the aircraft passenger compartment suite 102 may include one or more telescopic doors 502. For instance, the one or more telescopic doors 502 may include a first telescopic door 502a, a second telescopic door 502b, up to an N number of telescopic doors. In this regard, the first telescopic door 502a may be configured to couple to a portion of the suite wall 106 and the second telescopic door 502b may be configured to couple to a portion of the first telescopic door 502a, such that the second telescopic door 502 is configured to fully close the opening 126 within the suite 102.

The one or more telescopic doors 502 may include a multi-level redundant rail and carriage assembly 500 including one or more redundant rail and carriage assemblies 202. For example, as shown in FIG. 5, the multi-level redundant rail and carriage assembly 500 may be a two-level assembly including a first assembly and a second assembly, where each assembly includes a primary and secondary rail/carriage assembly. For instance, the first door 502a may include a primary rail and carriage assembly 504 including a primary carriage 506 and a primary rail 508, where the primary rail 508 is coupled to the first door 502a and the primary carriage 506 is coupled to the suite wall. Further, the first door 502a may include a redundant rail and carriage assembly 510 including a redundant carriage 512 and a redundant rail 514, where the redundant rail 514 is coupled to the suite wall and the redundant carriage 512 is coupled to the first door 502a. Continuing with this example, the second door 502b may include a primary rail and carriage assembly 516 including a primary carriage 518 and a primary rail 520, where the primary rail 520 is coupled to the second door 502b and the primary carriage 518 is coupled to the first door 502a. Further, the second door 502b may include a redundant rail and carriage assembly 522 including a redundant carriage 524 and a redundant rail 526, where the redundant rail 526 is coupled to the first door 502a and the redundant carriage 524 is coupled to the second door 502b.

It is noted that the one or more telescopic doors 502 may include any number of multi-level rail and carriage assemblies 500 coupled to one or more portions of the suite wall/door 502. For example, the one or more telescopic doors 502 may include an upper assembly coupled to an upper portion of the suite wall/doors 502 and a lower assembly coupled to a lower portion of the suite wall/doors 502. Further, is noted that the multi-level redundant rail and carriage assembly 500 may include any number of levels including any number of assemblies and any number of doors 502. FIG. 5 is provided merely for illustrative and shall not be construed as limiting the scope of the present disclosure.

Although embodiments of the disclosure illustrate the actuatable door 200 being stowed in a specific location, the stowed door position may be anywhere within the passenger suite 102 that would still allow for a deployed position within the opening 126.

It is noted the door 200 may be manually actuated. In addition, it is noted the door 200 may be electrically-actuated via a motor (e.g., a servo motor, or the like) coupled to a controller. For example, the controller may include one or more processors and memory, where the memory is configured to store a set of program instructions, where the set of program instructions are configured to cause the one or more processors to perform one or more actions with respect to actuations of the actuatable door 200. A user input device and/or a display may be installed within the passenger suite 102 or coupled to an exterior surface of the passenger suite 102, and the controller is configured to receive commands (e.g., to deploy the actuatable door 200, or stow the actuatable door 200) from the user input device and/or the display.

Although embodiments of the disclosure illustrate the actuatable door 200 being installed and actuatable within the boundaries of the passenger suite 102, it is noted the actuatable door 200 may be coupled to an exterior surface of the passenger suite 102 and actuatable between the door stowed position and the door deployed position outside of the passenger suite 102 (e.g., in the aircraft aisle 128). Therefore, the above description should not be interpreted as a limitation on the scope of the disclosure but merely an illustration.

In this regard, the passenger suite 102 includes an actuatable door 200. The redundant rail and carriage assembly should cause the door to operate normally without the passenger being aware of a primary mechanical system failure, so as to reduce the need for special pre-flight instruction or demonstrations. The redundant rail and carriage assembly should reduce the need for naïve subject testing, so as to streamline the certification process with respect to aviation guidelines and standards.

Although embodiments of the disclosure are directed to an aviation environment such as an aircraft cabin 100, it is noted the actuatable door 200 is not limited to the aviation environment and/or the aircraft components within the aviation environment. For example, the actuatable door 200 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the actuatable door 200 may be configured for commercial or industrial use in either a home or a business. Therefore, the above description should not be interpreted as a limitation on the present disclosure but merely an illustration.

Further, although embodiments of the disclosure are directed to an actuatable door 200, it is noted that redundant rail and carriage assembly 202 is not limited to actuating a door 200.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An actuatable door for an aircraft passenger suite installed within an aircraft cabin comprising:
   one or more redundant rail and carriage assemblies, the one or more redundant rail and carriage assemblies coupled to a portion of the actuatable door,
   each redundant rail and carriage assembly comprising:
      a primary rail and carriage sub-assembly, the primary rail and carriage sub-assembly including a primary rail and a primary carriage; and
      a secondary rail and carriage sub-assembly, the secondary rail and carriage sub-assembly including a secondary rail and a secondary carriage, the secondary rail being different than the primary rail, the secondary carriage being different than the primary carriage,
   the actuatable door being coupled to a suite wall of the aircraft passenger suite, the suite wall including an opening configured to allow for access to the aircraft passenger suite from an open area within the aircraft cabin,
   the actuatable door being configured to actuate between a stowed door position and a deployed door position via at least one intermediate door position using one of the primary rail and carriage sub-assembly or the secondary rail and carriage sub-assembly, the secondary rail and carriage sub-assembly being configured to automatically actuate the actuatable door via the secondary rail and the secondary carriage if one of the primary rail or the primary carriage of the primary rail and carriage sub-assembly fails, such that the failure is imperceptible to the operator,
   the actuatable door being configured to separate the aircraft passenger suite from the open area within the aircraft cabin when in the deployed door position and provide privacy to the aircraft passenger suite,
   wherein, for each redundant rail and carriage assembly, the primary rail is mounted to the suite wall, the secondary rail is mounted to the actuatable door, and the primary and secondary carriages are coupled by a coupling bridge.

2. The actuatable door of claim 1, wherein a first secondary rail of a first secondary rail and carriage sub-assembly is coupled to a top portion of the actuatable door and an additional secondary rail of an additional secondary rail and carriage sub-assembly is coupled to a bottom portion of the actuatable door.

3. The actuatable door of claim 2, wherein a first primary rail of a first primary rail and carriage sub-assembly is coupled to a top portion of the suite wall of the aircraft passenger suite and an additional primary rail of an additional primary rail and carriage sub-assembly is coupled to a bottom portion of the suite wall of the aircraft passenger suite.

4. The actuatable door of claim 3, wherein a first secondary carriage of the first secondary rail and carriage sub-assembly is coupled to a top portion of the actuatable door and an additional secondary carriage of the additional secondary rail and carriage sub-assembly is coupled to a bottom portion of the actuatable door.

5. The actuatable door of claim 4, wherein a first primary carriage of the first primary rail and carriage sub-assembly is coupled to a top portion of the suite wall of the aircraft passenger suite and an additional primary carriage of the additional primary rail and carriage sub-assembly is coupled to a bottom portion of the suite wall of the aircraft passenger suite.

6. The actuatable door of claim 1, wherein the travel of the primary carriage on the primary rail is equal to the travel of the secondary carriage on the secondary rail.

7. The actuatable door of claim 1, wherein the coupling bridge has a curved shape to protrude from a cover shroud to block a view of the one or more redundant rail and carriage assemblies.

8. An aircraft passenger suite comprising:
a suite wall installed within an aircraft cabin, the suite wall including an opening configured to allow for access to the passenger suite from an open area within the aircraft cabin; and
one or more actuatable doors, the one or more actuatable doors being configured to separate the passenger suite from the open area within the aircraft cabin when in a deployed door position and provide privacy to the aircraft passenger suite, each actuatable door comprising:
one or more redundant rail and carriage assemblies, the one or more redundant rail and carriage assemblies coupled to a portion of the actuatable door,
each redundant rail and carriage assembly comprising:
a primary rail and carriage sub-assembly, the primary rail and carriage sub-assembly including a primary rail and a primary carriage; and
a secondary rail and carriage sub-assembly, the secondary rail and carriage sub-assembly including a secondary rail and a secondary carriage, the secondary rail being different than the primary rail, the secondary carriage being different than the primary carriage,
the one or more actuatable doors being configured to actuate between a stowed door position and the deployed door position via at least one intermediate door position, using one of the primary rail and carriage sub-assembly or the secondary rail and carriage sub-assembly, the secondary rail and carriage sub-assembly being configured to automatically actuate the actuatable door via the secondary rail and the secondary carriage if one of the primary rail or the primary carriage of the primary rail and carriage sub-assembly fails, such that the failure is imperceptible to the operator,
wherein, for each redundant rail and carriage assembly, the primary rail is mounted to the suite wall, the secondary rail is mounted to the actuatable door, and the primary and secondary carriages are coupled by a coupling bridge.

9. The aircraft passenger suite of claim 8, wherein a first secondary rail of a first secondary rail and carriage sub-assembly is coupled to a top portion of the one or more actuatable doors and an additional secondary rail of an additional secondary rail and carriage sub-assembly is coupled to a bottom portion of the one or more actuatable doors.

10. The aircraft passenger suite of claim 9, wherein a first primary rail of a first primary rail and carriage sub-assembly is coupled to a top portion of a suite wall of the aircraft passenger suite and an additional primary rail of an additional primary rail and carriage sub-assembly is coupled to a bottom portion of the suite wall of the aircraft passenger suite.

11. The aircraft passenger suite of claim 10, wherein a first secondary carriage of a first secondary rail and carriage sub-assembly is coupled to a top portion of the one or more actuatable doors and an additional secondary carriage of an additional secondary rail and carriage sub-assembly is coupled to a bottom portion of the one or more actuatable doors.

12. The aircraft passenger suite of claim 11, wherein a first primary carriage of a first primary rail and carriage sub-assembly is coupled to a top portion of the suite wall and an additional primary carriage of an additional primary rail and carriage sub-assembly is coupled to a bottom portion of the suite wall.

13. The aircraft passenger suite of claim 8, at least a portion of the passenger suite being defined by a bridge installed within the aircraft cabin.

14. The aircraft passenger suite of claim 8, further comprising:
an aircraft seat.

15. The aircraft passenger suite of claim 8, wherein the coupling bridge has a curved shape to protrude from a cover shroud to block a view of the one or more redundant rail and carriage assemblies.

* * * * *